3,063,912
METHOD OF PREPARING THE ENZYME ESSENTIAL SOLUTION WHICH CONTAINS VARIOUS SPECIES OF VEGETABLE ENZYMES

Noboru Otaka, 17 Minami, 16 chopme, Higashi-Nijo, Obihiro-shi, Hokkaido, Japan
No Drawing. Filed Nov. 12, 1959, Ser. No. 852,186
3 Claims. (Cl. 195—63)

The present invention relates to the method of preparing an enzyme essential solution, that is a solution rich in enzymes, and containing various species of vegetable enzymes, and which solution is capable of strongly decomposing protein, starch, carbohydrates, fats, etc. and possesses strong sterilizing power.

It is the principal object of this invention to provide a simplified and economical method by which to prepare an enzyme rich solution of the class described.

This and other more specific objects and advantages of the invention will appear from the following detailed description.

The method of this invention comprises washing several to fifty or sixty species of arbitrary fruits, vegetables, root crops, weeds, sea-weeds and leaves, cutting them in adequate length, candying with sugar, loading the individual or a few species of the above materials in a vessel by separating each other by means of gauze (carbasus absorbens) or cloths, covering the upper part by the sugar layer, putting this vessel in the chamber wherein the temperature is regulated from approximately —5° C. (minimum) to 40° C. (maximum), and varying the above chamber temperature from the minimum to the maximum value alternately for ten to thirty days. As a result, the abstracted various enzymes in each vegetable body ooze out and are transferred into the sugar part which is consequently decomposed.

Explaining one of the practical procedures for this invention, the raw materials such as vegetable, fruits, etc., used for this invention are as follows: Watermelon, tomato, pear, peel of Japanese mandarin, melon, banana, fig, strawberry, peach, grape, cherry, mulberry, leaves of mulberry, apple, cumquat, pineapple, suffron, cucumber, eggplum, green onion, garlic, scallion, peas, cabbage, spinach, trefoil, Japanese parsley, udo, Chinese cabbage, turnip, malt, arrowhead, celery, parsley, bamboo-shoot, mushroom, chestnut, Japanese melon (Ajiuri), Taina, lily, lotus rhizome, radish, carrot, burdock, leaves of bamboo-grass, tangle, tea-leaves, etc.

Several to fifty or sixty species of these fruits, vegetables, etc., are washed by water satisfactorily, dried in the shade to remove the washing water, cut around two to three inches in length, and sugar sprinkled over them. Each or a few species of the above candied vegetables or fruits are loaded in a cedar (Cryptomeria) barrel wherein a small amount of salt is sprinkled and bamboo-grass leaves are laid at the bottom. The above loaded fruits and vegetables are covered by a cedar plate, coated with sugar, and then the barrel is sealed.

The amount of sugar used is about five kilograms per about ten kilograms of these vegetables and/or fruits. Approximately 40% of whole inner volume is suitable for the occupied volume of these materials in the barrel. For the next step, the cellar, wherein the above barrel is stored, is separated into four rooms in which the temperature is kept at about —5° C., 10° C., 25° C. and 40° C. respectively. The barrel containing the treated materials as above is stored for six hours in each room and transferred to the another three rooms step by step. These temperature variations correspond with the four seasons of the year. This cycle continues day and night and is repeated for ten to thirty days. Another treatment for the temperature regulation to be adopted is as follows. The above barrel is kept in the cellar room wherein the temperature is regulated from about —5° C. (the lowest) to 40° C. (the highest) day and night, as described hereinabove. The temperature variation, which is equivalent to those of four seasons, namely spring, summer, autumn and winter, is applied within a day, and this cycle is repeated for ten to thirty days. Consequently, various enzymes in these vegetable bodies ooze out by virtue of the temperature change and are absorbed in the sugar which contacts with these vegetables directly. The semi-transparent sugar solution, the resulting matter decomposed by enzymes, which still contains enzymes, forms over the decomposed solid matter of sugar at the bottom. At this time, vegetables, fruits, gauze (carbasus absorbens) and others float on the essential solution, and some parts of the above decomposed matter from sugar form even on the cedar plate at the top. The enzyme essential solution of present invention is recovered by taking the above barrel out from the cellar room and filtering the solution.

The enzyme essential solution obtained as above is a colloidal, semi-transparent and strongly sweet solution, and contains extremely many species of vegetable enzymes in accordance with the species and variety of vegetables employed. The variety of uses for this solution is quite broad. For example, since this enzyme essential solution has a very strong sterilizing power, it is quite suitable as the antiseptic for foods such as soyabean-sauce, bean paste, fish meat, flesh of animals, and vegetables, etc. Since it decomposes protein, starch, carbohydrates and fats, it is also quite suitable as an aid to digestion. Since it decomposes sawdust, shavings (plane-dusts), straw and starch-waste in a short time, it enables the production of very effective manure and also feeds for animals.

While the present invention has been described with particular reference to preferred embodiments thereof, it will be appreciated that variation from the details given herein can be effected without departing from the invention in its broadest aspects.

I claim:
1. The method for preparing an enzyme essential solution containing various species of vegetable enzymes, which comprises washing several to sixty species of arbitrary vegetables, fruits, root crops, weeds, sea-weeds and leaves, etc., cutting in adequate length, spreading sugar over them, loading the above materials in a vessel by separating them with cloths at least into groups to form layers, covering the upper part with sugar layer, and subjecting the contents of the vessel to repeated daily temperature cycles for at least about ten days wherein each cycle ranges from about —5° C. to about 40° C. in a plurality of step-wise increments, whereby the various enzymes which ooze from the various materials are absorbed into and decompose the sugar part, the ratio of materials to sugar being about 2 to 1 in parts by weight, and separating the solution from the solids.

2. The method of preparing an enzyme essential solution which comprises covering about 2 parts by weight of enzyme-containing plant material with about one part by weight of sugar, and subjecting the mixture to repeated daily temperature cycles for at least about ten days wherein each cycle ranges from about −5° C. to about 40° C. in a plurality of step-wise increments, whereby the various enzymes which ooze from the plant material are absorbed into and decompose the sugar, and separating the solution from the solids.

3. An enzyme essential solution prepared by the method of claim 2.

References Cited in the file of this patent

UNITED STATES PATENTS

| Re. 4,606 | Deacon | Oct. 24, 1871 |
| 1,729,893 | Oliver | Oct. 1, 1929 |
| 2,929,719 | Walburn | Mar. 22, 1960 |

FOREIGN PATENTS

| 209,086 | Great Britain | Dec. 27, 1923 |